United States Patent
Yacoub et al.

(10) Patent No.: US 10,557,431 B2
(45) Date of Patent: Feb. 11, 2020

(54) INDIRECT MEASUREMENT OF RELATIVE AIR HUMIDITY

(71) Applicant: Ford Global Technologies, LLC, Dearborn, MI (US)

(72) Inventors: Yasser Mohamed sayed Yacoub, Cologne (DE); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1483 days.

(21) Appl. No.: 13/934,150

(22) Filed: Jul. 2, 2013

(65) Prior Publication Data
US 2014/0014079 A1    Jan. 16, 2014

(30) Foreign Application Priority Data

Jul. 12, 2012 (DE) .......................... 10 2012 212 234

(51) Int. Cl.
*F02B 47/08*    (2006.01)
*F02D 41/14*    (2006.01)
*G01M 15/04*    (2006.01)

(52) U.S. Cl.
CPC ........... *F02D 41/144* (2013.01); *G01M 15/04* (2013.01)

(58) Field of Classification Search
CPC ........... F02D 2200/0418; F02D 41/005; F02D 41/222; F02D 41/144; F02D 41/0072; F02D 41/0055
USPC .................................................. 123/568.16
See application file for complete search history.

(56) References Cited

U.S. PATENT DOCUMENTS

| | | | | |
|---|---|---|---|---|
| 4,658,790 A * | 4/1987 | Kitahara | ....................... | 123/693 |
| 5,402,665 A * | 4/1995 | Hart | ..................... | G01D 18/008 |
| | | | | 340/632 |
| 6,832,472 B2 * | 12/2004 | Huang | .................. | F02D 35/021 |
| | | | | 123/406.26 |
| 7,281,368 B2 * | 10/2007 | Miyake | ............... | F02D 41/0052 |
| | | | | 123/403 |
| 7,389,762 B1 * | 6/2008 | Gibson | ................... | F02D 13/06 |
| | | | | 123/198 D |
| 7,715,976 B1 * | 5/2010 | Xiao et al. | ..................... | 701/108 |

(Continued)

FOREIGN PATENT DOCUMENTS

CN    101988415 A    3/2011
CN    201902257 U    7/2011

(Continued)

OTHER PUBLICATIONS

Absolute and Relative Gas Concentration: Understanding Oxygen in Air by Bruce Bugbee and Mark Blonquist.*

(Continued)

*Primary Examiner* — Long T Tran
*Assistant Examiner* — James J Kim
(74) *Attorney, Agent, or Firm* — Geoffrey Brumbaugh McCoy Russell LLP

(57) ABSTRACT

The disclosure relates to a method for the measurement of relative air humidity in a fresh air induction tube of an internal combustion engine. Here a concentration of oxygen in the fresh air induction tube is measured by an oxygen sensor and a temperature in the fresh air induction tube is determined. The relative air humidity is determined depending on the measured concentration of oxygen and the determined temperature.

15 Claims, 3 Drawing Sheets

(56) References Cited

U.S. PATENT DOCUMENTS

| | | | |
|---|---|---|---|
| 8,459,243 B2* | 6/2013 | Van Nieuwstadt et al. | ................ 123/677 |
| 8,603,310 B2* | 12/2013 | Ishida | .................. G01N 27/419 123/703 |
| 2008/0276913 A1* | 11/2008 | Zubeck | .................. B60K 6/442 123/543 |
| 2009/0254245 A1 | 10/2009 | Bauerle | |
| 2010/0326408 A1 | 12/2010 | Clarke et al. | |
| 2012/0227714 A1 | 9/2012 | Surnilla et al. | |
| 2013/0036806 A1* | 2/2013 | Kohno | ....................... 73/114.33 |

FOREIGN PATENT DOCUMENTS

| | | |
|---|---|---|
| DE | 19831748 A1 | 1/2000 |
| DE | 102007053719 B3 | 6/2009 |
| EP | 1079090 B1 | 5/2006 |
| EP | 2385236 A1 | 11/2011 |

OTHER PUBLICATIONS

Pursifull R., et al., "Humidity Sensor Diagnostics," U.S. Appl. No. 13/774,319, filed Feb. 22, 2013, 46 pages.

Pursifull R., et al., "Humidity Sensor Diagnostics," U.S. Appl. No. 13/774,282, filed Feb. 22, 2013, 48 pages.

Jankovic, Mrdjan K et al., "Humidity Sensor Diagnostics," U.S. Appl. No. 13/774,234, filed Feb. 22, 2013, 29 pages.

Anonymous, "Utilizing Oxygen Sensor Inside PHEV Fuel Tank to Improve Evap Monitor Robustness," IPCOM No. 000232578, Published Nov. 18, 2013, 2 pages.

Anonymous, "Humidifier concept for cost effective humidification of air delivery in FC stack," IPCOM No. 000223254, Published Nov. 14, 2012, 20 pages.

Partial Translation of Office Action of Chinese Application No. 201310291200.2, dated Aug. 3, 2016, State Intellectual Property Office of PRC, 11 Pages.

Yi, Quian Ren, "Gasoline Engine Electronic Control and Inspectionand Maintenance (IM) Technology," Partial Translation of pp. 54-59, ISBN 9787111339489, 8 pages.

Partial Translation of Office Action of Chinese Application No. 201310291200.2, dated Mar. 31, 2017, State Intellectual Property Office of PRC, 12 pages.

\* cited by examiner

INDIRECT MEASUREMENT OF RELATIVE AIR HUMIDITY

CROSS REFERENCE TO RELATED APPLICATIONS

The present application claims priority to German Patent Application No. 102012212234.6, filed on Jul. 12, 2012, the entire contents of which are hereby incorporated by reference for all purposes.

FIELD

The disclosure relates to a method for the measurement of relative air humidity in a fresh air induction tube of an internal combustion engine.

BACKGROUND AND SUMMARY

The air humidity of the fresh air that is delivered to an internal combustion engine as part of the fuel mixture influences the combustion process. Here the water vapor admixed by means of the air humidity reduces the combustion temperature, whereby in particular fewer harmful and unwanted nitrogen oxides occur. For this reason there is a desire to measure the relative air humidity of the fresh air in order to be able to model and, if appropriate, to control the quantities of contaminants occurring during the combustion process. If the relative air humidity is known, the effect of systems for contaminant reduction and Exhaust Gas Recirculation (EGR), Lean NOx Traps (LNT) or Selective Catalytic Reduction (SCR) is detected or such systems can be controlled for improved efficiency. Such a method for the operation of an internal combustion engine is known, e.g. from DE 10 2007 053 719 B3. As with DE 198 31 748 A1, which is concerned with a similar problem, a humidity sensor is used.

But here there is the problem that the relative air humidity is relatively difficult to measure accurately and with a small delay over the great range of the fluctuation of temperatures that can occur in a fresh air induction tube.

Accordingly, a method for the measurement of relative air humidity in a fresh air induction tube of an internal combustion engine is provided. The method comprises measuring a concentration of oxygen in the fresh air induction tube by an oxygen sensor, determining a temperature in the fresh air induction tube, and determining the relative air humidity depending on the measured concentration of oxygen and the determined temperature.

The disclosures based on the knowledge that the relative air humidity can be measured indirectly using an oxygen sensor. Here the deviation of the measured concentration of oxygen from the nominal value of about 21 percent for normal ambient air is determined and the relative air humidity is determined using the likewise determined temperature occurring in the fresh air induction tube.

By means of said indirect measurement of the relative air humidity, the method according to the disclosure enables a simple and accurate measurement of the relative air humidity, without having to use the separate sensor provided for this purpose in the previous systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
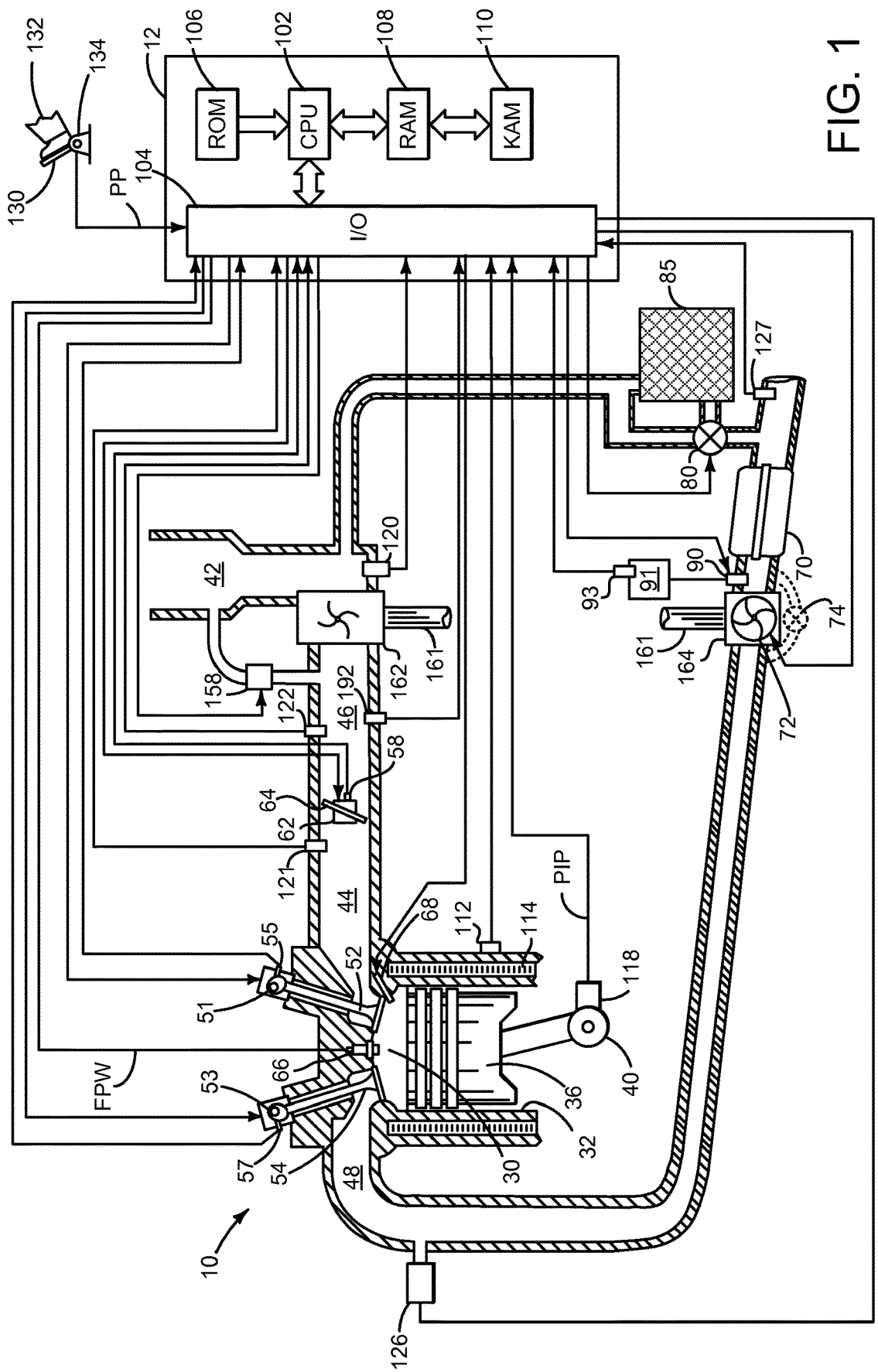
FIG. 1 is a schematic of a single cylinder of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank (not shown), fuel pump (not shown), fuel pump control valve (not shown), and fuel rail (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. Further, in some examples, the UEGO sensor may be a NOx sensor that has both NOx and oxygen sensing elements. NOx sensor 127 samples tailpipe NOx downstream of SCR 70.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include SCR catalyst bricks, in one example. In another example, multiple emission control devices, each with multiple bricks, can be used. Emissions device 70 can include an oxidation catalyst in one example. In other examples, the emissions device may include a lean NOx trap followed by a selective catalyst reduction (SCR), and/or a diesel particulate filter (DPF). Urea may be injected upstream of SCR catalyst 70 via urea injector 90. Urea injector 90 receives urea from urea tank 91. Level sensor 93 senses the amount of urea stored in urea tank 91.

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back toward BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC.

Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Additionally, an intake gas composition sensor 192 is provided in the air intake system. As illustrated, intake gas composition sensor 192 is positioned in the boost chamber 46 upstream of the throttle. However, the intake gas composition sensor may be provided in a different portion of the intake system, such as the intake manifold 44. Intake gas sensor 192 may determine the concentration of oxygen in the intake air, for example. Intake gas sensor 192 may be a wideband oxygen sensor in one example, or a narrowband oxygen sensor in another example. The intake gas composition sensor measures the partial pressure of oxygen, which is also dependent on total intake air pressure. As such, the output of the intake gas composition sensor may be corrected based on the intake air sensor. Further, the presence of other oxidants and reductants may affect the intake gas composition reading.

Output from the intake gas composition sensor 192 may be used to determine the humidity of the intake air under some conditions. As will be described in more detail below with respect to FIGS. 2-3, a high level of humidity may reduce the oxygen content of the intake air by an amount large enough to be detected by the intake gas sensor. Thus, when humidity increases, the oxygen content of the intake air measured by the intake gas sensor will decrease. Conversely, when humidity decreases, the oxygen content of the intake air will increase.

The correlation of the humidity of the intake air to the intake oxygen concentration may be dependent on the temperature of the intake air. As explained in more detail below with respect to FIG. 2, at relatively low temperatures (e.g. 30° C.), intake air oxygen concentration may be relatively independent of intake air humidity. At higher temperatures (e.g. 90° C.), the intake oxygen concentration may decrease as humidity increases. Thus, in some examples, the temperature of the intake air may be determined by a temperature sensor in order to correctly correlate the humidity to the intake oxygen concentration. The temperature sensor may be included as part of the intake gas composition sensor 192, or may be provided as a separate sensor. Because the accuracy of the correlation between intake oxygen concentration and humidity increases as temperature increases, in some embodiments the intake air may be heated when measuring the intake oxygen concentration. To heat the intake air, a heat exchanger may be provided in the intake passage. However, under some conditions it may not be desirable to heat all the intake air reaching the engine (for example, hot intake air may place a large burden on the engine cooling system and/or cause combustion stability issues). Thus, the intake gas composition sensor 192 may be provided in a separate, parallel conduit from the intake passage, and the air traveling through the conduit and past the intake gas composition sensor may be heated by an electric heater or via heat exchange from the engine.

The temperature in the fresh air induction tube (otherwise referred to as the intake passage) can be determined, e.g. using a temperature measurement with a temperature sensor. Here the temperature sensor can be disposed directly in the fresh air induction tube or at a location with a connection to the fresh air induction tube. In the first case the temperature in the fresh air induction tube can be accurately determined by direct measurement. In the second case the temperature in the fresh air induction tube can be derived using suitable modeling from the temperature measurement values measured at the actual location of the temperature sensor.

The temperature in the fresh air induction tube can in particular also be determined with a mathematical model of the temperature. Here operating parameters of the internal combustion engine and modeling of the thermal conditions of the device can be taken into account in the mathematical model of the temperature in order to enable sufficiently accurate estimation of the temperature. In particular, temperature values determined at other locations of the device can be taken into account.

It is also possible to bring the temperature in the fresh air tube within a predetermined range of values by heating or cooling. On the one hand this can be used to enable the determination of the temperature, because this is set to a predetermined value and the temperature value determined may correspond to the predetermined value, on the other hand the measurement accuracy can be increased. The increase in the measurement accuracy is based on the observation that the measurement values for the concentration of oxygen at higher temperatures cover a significantly greater range of values for the same interval of the relative air humidity. E.g. a change in the relative air humidity of 30 and 70 percent at a temperature of 30 degrees Celsius only leads to a variation of the measured concentration of oxygen of about 1.5 percent, whereas the same variation of the relative air humidity at a temperature of 90 degrees Celsius leads to a variation of the measured concentration of oxygen of more than 5 percent. Compare this in particular to FIG. 2 and the corresponding description. The measurement accuracy can thus be increased, in particular by heating the fresh air. However, cooling, e.g. by means of a radiator, can also be useful if the relative air humidity is modeled particularly accurately as a function of temperature and the measured oxygen in the air within the specified temperature interval to be set up.

A calibration step may be carried out in the method if the temperature in the fresh air induction tube is below a predetermined threshold temperature. This embodiment of the method according to the disclosure also takes advantage of the varying dependency of the measurement values of the concentration of oxygen on the temperature. Because for low temperatures the concentration of oxygen is almost independent of the relative air humidity of the air, it can be assumed that for low temperatures the output value of the oxygen sensor is equal to the nominal value of about 21 percent for normal ambient air. Thus a predetermined threshold temperature is specified, which can be e.g. 30 degrees Celsius or lower, because below this temperature the possible measurement values for the concentration of oxygen are almost independent of the temperature.

Particularly preferably, in the calibration step a current output value of the oxygen sensor is set equal to a predetermined concentration of oxygen. Said predetermined concentration of oxygen normally corresponds to the nominal value for the concentration of oxygen of normal ambient air, i.e. about 21 percent. As the current output value of the oxygen sensor at a temperature below the predetermined threshold temperature is set equal to the nominal value for the concentration of oxygen of normal ambient air, an offset of the sensor can be eliminated for the measurement.

A second aspect of the disclosure relates to a motor vehicle having a fresh air induction tube, which is connected to an internal combustion engine and in which an oxygen sensor is disposed, and a control unit connected to the oxygen sensor including instructions to carry out the method according to the disclosure.

Figure 2:
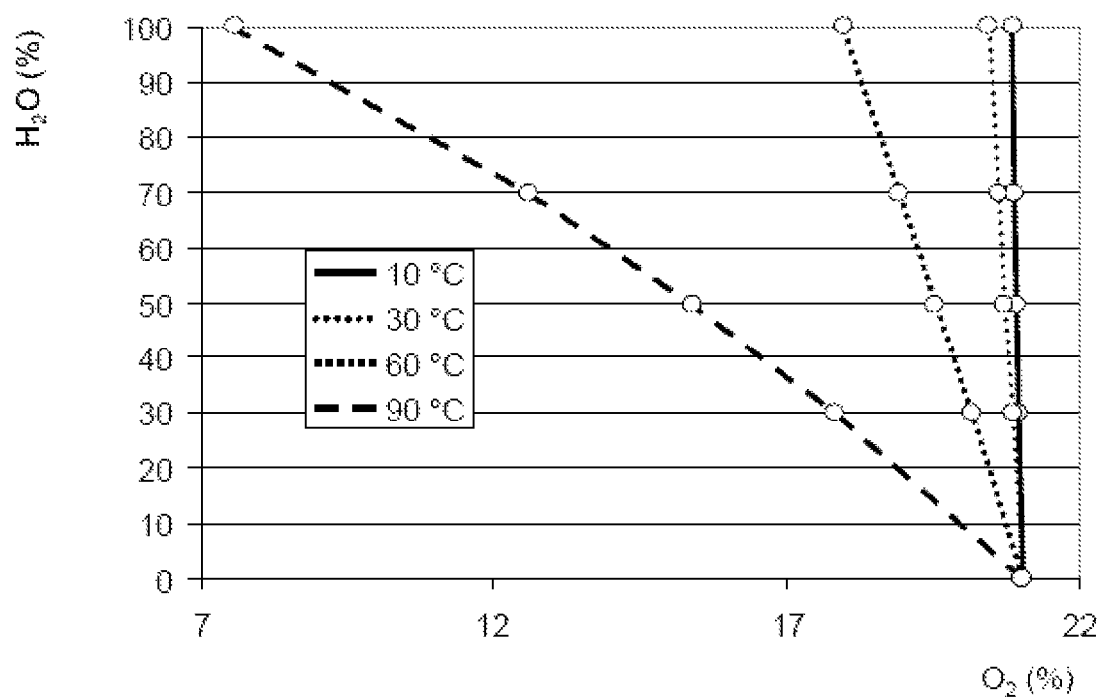
FIG. 2 is a graph illustrating an example correlation between intake air humidity and oxygen concentration.

FIG. 2 shows a diagram, in which the relative air humidity is applied linearly in values from 0 through 100 percent over the measured concentration of oxygen with values between 7 and 22 percent for temperatures of 10, 30, 60 and 90 degrees Celsius. An almost linear relationship between the relative air humidity and the measured concentration of oxygen is shown for all temperatures. For reducing temperatures the influence of the relative air humidity on the measured concentration of oxygen is ever smaller, so that for a temperature of 10 degrees Celsius an almost constant measurement value is given for any relative air humidities. With increasing temperatures, by contrast other measurement ranges are covered, so that the indirect measurement of the relative air humidity by means of the measurement of the concentration of oxygen is ever more accurate. Because waste heat occurs with the operation of an internal combustion engine, the fresh air can be simply heated, e.g. by means of a heat exchanger, in order to guarantee sufficient measurement accuracy.

Figure 3:
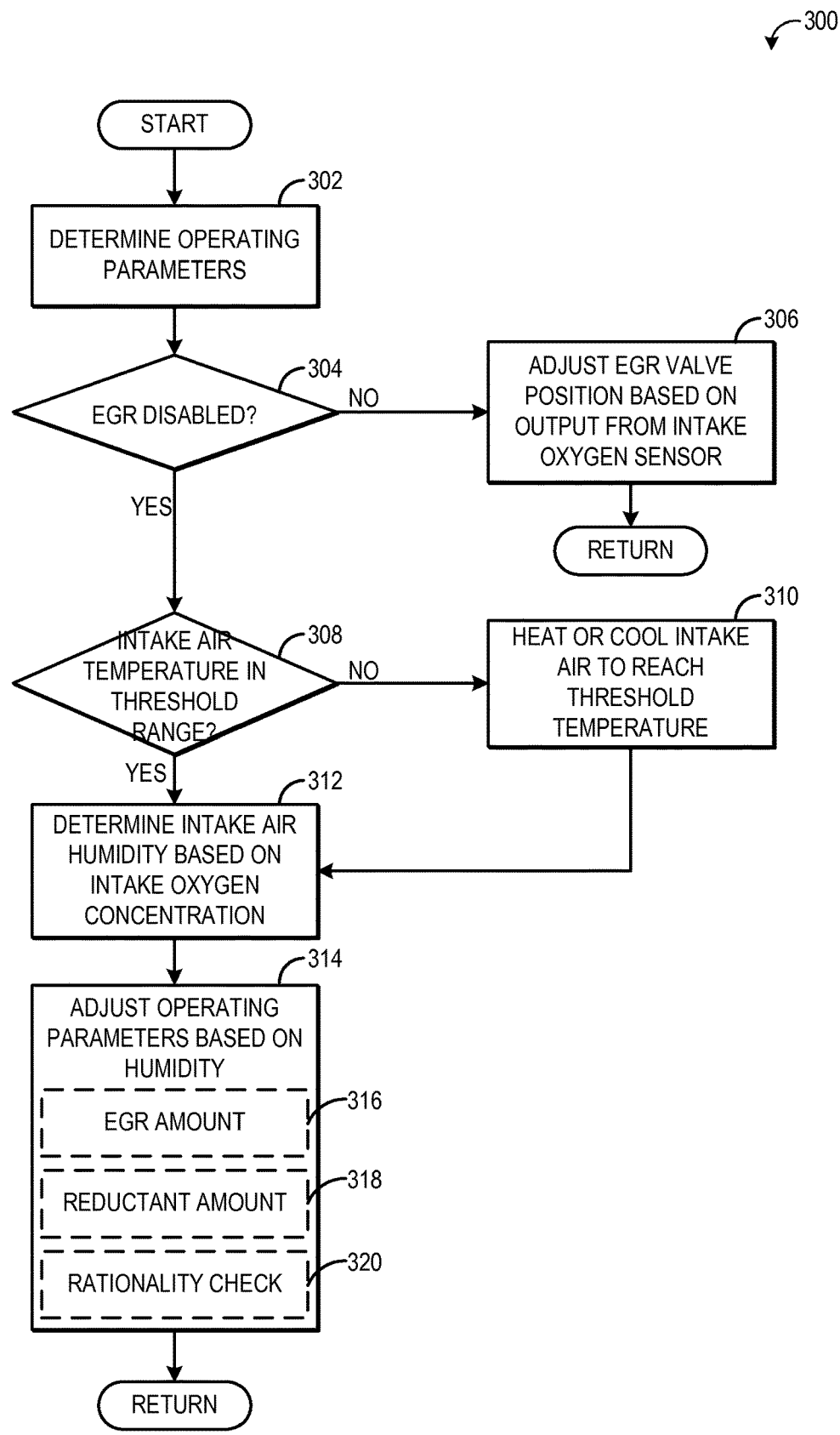
FIG. 3 is a flow chart illustrating a method for determining intake air humidity according to an embodiment of the present disclosure.

FIG. 3 is a flow chart illustrating a method 300 for determining intake air humidity based on output from an intake oxygen sensor, such as intake gas composition sensor 192 of FIG. 1. Method 300 may be carried out by an engine controller, such as controller 12, according to instructions stored thereon.

At 302, method 300 includes determining engine operating parameters. The determined engine operating parameters may include, but are not limited to, engine speed and load, engine temperature, intake air temperature, EGR valve position, and intake oxygen concentration. At 304, it is determined if EGR is disabled. As explained above with respect to FIG. 1, the EGR system routes exhaust back to the engine intake in order to reduce the oxygen concentration of the charge air. Because EGR lowers the intake oxygen concentration, the presence of EGR in the intake air may confound the determination of the intake air humidity. Thus, when EGR is enabled, accurate humidity measurements may not be taken. EGR may cause combustion stability issues at certain engine speed/load points. As such, EGR may be disabled during idle operation, at high engine loads, or other operating conditions. Disabled EGR may be indicated by EGR valve position (for example, if the EGR valve is fully closed, it may be determined that EGR is disabled) or by engine speed and load.

If EGR is not disabled, method 300 proceeds to 306 to adjust EGR valve position based on feedback from the intake oxygen sensor. For example, based on engine speed and load, a designated intake air oxygen concentration may be maintained by adjusting the EGR valve position and hence the amount of EGR directed to the intake. Method 300 then returns.

If EGR is disabled, method 300 proceeds to 308 to determine if intake air temperature is within a threshold range. As explained above with respect to FIG. 2, intake air humidity may be correlated with intake air oxygen concentration; however, the accuracy of the correlation depends on the temperature of the intake air. At lower temperatures, intake air oxygen concentration is relatively independent of intake air humidity, while at higher temperatures, intake air oxygen concentration is dependent on the humidity of the intake air. The threshold range may be a suitable temperature range over which small changes in intake air humidity may be detected by the intake oxygen concentration, such as between 60 and 90° C.

If the intake air temperature is not within the threshold range, method 300 proceeds to 310 to heat or cool the intake air to reach the designated temperature range, and then method 300 proceeds to 312. Further, if the intake air is already within the threshold temperature at 308, method 300 also proceeds to 312. At 312, the intake air humidity is determined based on the intake air oxygen concentration. In one example, the controller may include a look-up table or graph that correlates intake oxygen concentration to intake air humidity, such as the diagram illustrated in FIG. 2. The intake air humidity may be further based on temperature. As an example, according to the diagram of FIG. 2, if intake air temperature is 60° C. and the output from the intake oxygen sensor indicates that intake air oxygen concentration is 19.5%, the relative intake air humidity may be determined to be 50%. While the described example determines the relative humidity of the intake air, in some examples the specific humidity may be determined.

At 314, one or more engine operating parameters may be adjusted based on the determined intake air humidity. The determined humidity may be used to adjust one or more engine operating parameters, such as the amount of EGR (LP and/or HP) directed to the engine during a future operating period where EGR is enabled, as indicated at 316. For example, EGR lowers the oxygen content of the cylinder charge, which may lead to combustion stability issues. If humidity is high, combustion issues may be further exacerbated, and thus EGR levels may be controlled based on intake air humidity. Other parameters that may be adjusted based on humidity include an amount of reductant (e.g., fuel or urea) provided to an exhaust aftertreatment device (as indicated at 318), spark timing, air-fuel ratio, etc. Further, as indicated at 320, a rationality check may be performed based on the determined humidity. The rationality check may be performed on the intake oxygen sensor, a humidity sensor also provided in the intake system, the EGR valve, or other suitable components.

The rationality check may be performed during conditions of known humidity in one example. If the vehicle in which the engine is installed enters a car wash or passes through a rain shower, for example, the humidity may be assumed to be 100%. If the humidity is known and the intake air temperature is known (determined from the intake air temperature sensor for example), the output from the intake oxygen sensor may be compared to a predicted or estimated intake oxygen concentration that is based on the known humidity and temperature. If the output differs from the estimated concentration, degradation of the intake oxygen sensor may be indicated.

Similarly, the position of the EGR valve may be diagnosed using the intake oxygen concentration and known humidity and intake air temperature. In one example, the EGR valve may be commanded closed and the intake air temperature and oxygen concentration measured during conditions of known humidity. Then, the EGR valve may be commanded to a designated position. If the intake air oxygen concentration does not drop to a designated concentration, it may be determined that the EGR valve is degraded.

As explained above, the accuracy of the correlation between the intake air humidity and the intake air oxygen concentration increases as temperature increases. Thus, when performing the rationality check for the oxygen sensor or the EGR valve, the check may be corrected based on the temperature of the intake air. At lower air temperatures, a larger amount of difference between the estimated intake air oxygen concentration and the measured intake air oxygen concentration may be tolerated before degradation of the intake oxygen sensor or EGR valve is indicated. Then, as intake air temperature increases, the amount of difference tolerated between the estimated intake air oxygen concentration and the measured intake air oxygen concentration before degradation of the intake oxygen sensor or EGR valve is indicated may decrease.

Thus, in one example, during conditions of known humidity, degradation of the intake air oxygen sensor or the EGR valve may be indicated based on output from the intake air oxygen sensor. The degradation may be determined if an estimated intake air oxygen concentration differs from a measured intake air oxygen concentration by more than a threshold amount. The threshold amount may depend on the temperature of the intake air. For example, if the temperature of the intake air is lower than a threshold, the threshold may larger than if the temperature of the intake air is greater than the threshold.

Thus, the system and method described provide for a method comprising during select conditions, determining a relative humidity of engine intake air based on intake air oxygen concentration measured by an oxygen sensor.

In one example, the select conditions comprise exhaust gas recirculation (EGR) being disabled. When EGR is enabled, the method may further include adjusting an amount of EGR directed to the engine intake based on intake air oxygen concentration and the determined relative humidity. In an example, an amount of reductant delivered by an exhaust aftertreatment device positioned in an engine exhaust system may be adjusted based on the determined relative humidity.

The select conditions may alternatively or additionally comprise intake temperature being above a threshold temperature. If intake air temperature is less than the threshold temperature, the intake air may be heated prior to determining the relative humidity. In one example, the humidity of the intake air may only be determined if the intake air humidity is greater than a threshold temperature, such as 60° C. If the intake air temperature is not above the threshold temperature, then determination of the humidity of the intake air may be delayed until intake air is heated to or otherwise reaches the threshold temperature.

In an embodiment, a method comprises adjusting an amount of exhaust gas recirculated to an engine based on a humidity of engine intake air, the humidity determined based on oxygen concentration of the engine intake air. The method further comprises during a prior engine operation when exhaust gas recirculation is disabled, measuring the oxygen concentration of the engine intake air and determining the humidity of the engine intake air based on the measured oxygen concentration. The humidity may be further based on a temperature of the engine intake air.

The method may further comprise, during conditions of known humidity, determining a temperature and oxygen concentration of the engine intake air when exhaust gas recirculation (EGR) is disabled; commanding an EGR valve to a designated position; and indicating degradation of the EGR valve if the oxygen concentration of the engine intake air does not change by a threshold amount. The threshold amount may be based on the commanded position of the EGR valve and further based on intake air temperature.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for measurement of relative air humidity in a fresh air induction tube of an internal combustion engine, comprising:
measuring a concentration of oxygen in the fresh air induction tube by an oxygen sensor;
determining a temperature in the fresh air induction tube;
if the temperature in the fresh air induction tube is within a range, determining the relative air humidity at a controller as a function of the measured concentration of oxygen and the determined temperature, without a humidity sensor;
if the temperature in the fresh air induction tube is below the range, calibrating the oxygen sensor by setting a current output value of the oxygen sensor equal to a predetermined concentration of oxygen, heating air in the fresh air induction tube to bring the temperature in the fresh air induction tube into the range, and then determining the relative air humidity at the controller as a function of the measured concentration of oxygen and the determined temperature, without a humidity sensor; and
if the temperature in the fresh air induction tube is above the range, cooling the air in the fresh air induction tube to bring the temperature in the fresh air induction tube into the range and then determining the relative air humidity at the controller as a function of the measured concentration of oxygen and the determined temperature, without a humidity sensor.

2. The method of claim 1, wherein the temperature in the fresh air induction tube is determined using a temperature measurement with a temperature sensor.

3. The method of claim 1, wherein the temperature in the fresh air induction tube is determined with a mathematical model.

4. The method of claim 1, wherein the predetermined concentration of oxygen corresponds to a nominal value for a concentration of oxygen of ambient air.

5. The method of claim 1, wherein the concentration of oxygen in the fresh air induction tube is more dependent on a humidity of intake air when the temperature in the fresh air induction tube is within the range, as compared to the dependency of the concentration of oxygen in the fresh air induction tube on the humidity of the intake air when the temperature in the fresh air induction tube is above or below the range.

6. A motor vehicle, comprising:
a fresh air induction tube in which an oxygen sensor is disposed;
an internal combustion engine connected to the fresh air induction tube; and
a control unit connected to the oxygen sensor and including instructions to carry out the method of claim 1.

7. A method comprising:
when exhaust gas recirculation (EGR) is disabled and intake air temperature is greater than a threshold, determining a relative humidity of engine intake air with a controller as a function of an intake air oxygen concentration measured by an intake oxygen sensor, without a humidity sensor, and adjusting an actuator based on the determined relative humidity, and
during a future operating period when EGR is enabled, adjusting an amount of EGR directed to an engine intake based on the intake air oxygen concentration and further based on the relative humidity that was determined when EGR was disabled.

8. The method of claim 7, further comprising if intake air temperature is below the threshold, heating the intake air prior to determining the relative humidity.

9. The method of claim 7, wherein adjusting the actuator based on the determined relative humidity comprises adjusting an amount of reductant delivered by an exhaust aftertreatment device positioned in an engine exhaust system based on the determined relative humidity.

10. The method of claim 7, wherein the threshold above which the intake air oxygen concentration measured by the intake oxygen sensor is dependent on the relative humidity of engine intake air is 60 degrees Celsius.

11. The method of claim 7, wherein the intake air oxygen concentration measured by the intake oxygen sensor when the intake air temperature is above the threshold is more dependent on the relative humidity of engine intake air as compared to the dependency of the intake air oxygen concentration measured by the intake oxygen sensor on the relative humidity of the engine intake air when the intake air temperature is below the threshold.

12. A method, comprising:
adjusting an amount of engine exhaust gas recirculation (EGR) based on a humidity of engine intake air, the humidity determined without a humidity sensor based on oxygen concentration of the engine intake air; and
during conditions of known humidity:
determining a temperature and oxygen concentration of the engine intake air when EGR is disabled;
enabling EGR by commanding an EGR valve to a designated open position; and
indicating degradation of the EGR valve if the oxygen concentration of the engine intake air does not change by a first threshold amount when the temperature of the engine intake air is lower than a threshold, and indicating degradation of the EGR valve if the oxygen concentration of the engine intake air does not change by a second threshold amount when the temperature of the engine intake air is greater than the threshold, the first threshold amount larger than the second threshold amount.

13. The method of claim 12, further comprising during a prior engine operation when EGR is disabled, measuring the oxygen concentration of the engine intake air and determining the humidity of the engine intake air based on the measured oxygen concentration.

14. The method of claim 13, wherein the humidity is further based on the temperature of the engine intake air.

15. The method of claim 12, wherein the first and second threshold amounts are based on the commanded position of the EGR valve and further based on intake air temperature.

* * * * *